(12) United States Patent (10) Patent No.: US 8,267,327 B2
Tsao et al. (45) Date of Patent: Sep. 18, 2012

(54) PAYMENT CARD MANUFACTURING TECHNOLOGY

(75) Inventors: Paul Tsao, Los Altos, CA (US); Kerry D. Brown, Portola Valley, CA (US)

(73) Assignee: Qsecure, Inc., Los Altos, CA (US)

( * ) Notice: Subject to any disclaimer, the term of this patent is extended or adjusted under 35 U.S.C. 154(b) by 989 days.

(21) Appl. No.: 11/871,797

(22) Filed: Oct. 12, 2007

(65) Prior Publication Data

US 2008/0197533 A1 Aug. 21, 2008

Related U.S. Application Data

(63) Continuation-in-part of application No. 11/676,285, filed on Feb. 17, 2007, now abandoned.

(51) Int. Cl.
*G06K 19/06* (2006.01)
(52) U.S. Cl. .......... 235/493; 235/487; 235/488
(58) Field of Classification Search .......... 235/487, 235/488, 492, 493
See application file for complete search history.

(56) References Cited

U.S. PATENT DOCUMENTS

| | | | | | |
|---|---|---|---|---|---|
| 4,463,971 | A | * | 8/1984 | Hoppe et al. | 283/83 |
| 4,625,102 | A | * | 11/1986 | Rebjock et al. | 235/492 |
| 4,760,575 | A | * | 7/1988 | Watanabe | 714/719 |
| 4,792,843 | A | * | 12/1988 | Haghiri-Tehrani et al. | 257/679 |
| 4,797,543 | A | * | 1/1989 | Watanabe | 235/492 |
| 4,829,169 | A | * | 5/1989 | Watanabe | 235/492 |
| 4,897,534 | A | * | 1/1990 | Haghiri-Tehrani | 235/488 |
| 5,080,748 | A | * | 1/1992 | Bonomi | 156/364 |
| 5,416,358 | A | * | 5/1995 | Ochi et al. | 257/666 |
| 5,520,863 | A | * | 5/1996 | Ochi et al. | 264/46.5 |
| 5,585,194 | A | * | 12/1996 | Norman | 428/520 |
| 5,671,525 | A | * | 9/1997 | Fidalgo | 29/600 |
| 5,735,040 | A | * | 4/1998 | Ochi et al. | 29/841 |
| 5,834,747 | A | * | 11/1998 | Cooper | 235/449 |
| 5,883,377 | A | * | 3/1999 | Chapin, Jr. | 235/493 |
| 5,955,021 | A | * | 9/1999 | Tiffany, III | 264/272.11 |
| 5,984,191 | A | * | 11/1999 | Chapin, Jr. | 235/493 |
| 6,025,054 | A | * | 2/2000 | Tiffany, III | 428/189 |
| 6,036,099 | A | * | 3/2000 | Leighton | 235/488 |
| 6,138,917 | A | * | 10/2000 | Chapin, Jr. | 235/487 |
| 6,176,430 | B1 | * | 1/2001 | Finkelstein et al. | 235/487 |
| 6,241,153 | B1 | * | 6/2001 | Tiffany, III | 235/488 |
| 6,315,195 | B1 | * | 11/2001 | Ramachandran | 235/380 |
| 6,592,044 | B1 | * | 7/2003 | Wong et al. | 235/493 |
| 6,848,622 | B2 | * | 2/2005 | Kudo et al. | 235/492 |
| 6,902,116 | B2 | * | 6/2005 | Finkelstein | 235/492 |

(Continued)

*Primary Examiner* — Daniel Hess
*Assistant Examiner* — Paultep Savusdiphol

(57) ABSTRACT

A payment card manufacturing process glues a thin battery and an autonomously reprogrammable magnetic device to the inside surface of one of two outer front and rear laminate sheets. The magnetic device is pressed through a precisely cut rectangular hole provided for it in the rear laminate sheet, and is sealed with a gasket bead. Such magnetic device is critically placed flush in a magnetic stripe area, and the end gaps are such that they will minimize adverse magnetic transitions seen by a reader between the magnetic stripe field and the autonomously reprogrammable magnetic device. The surfaces of the battery, electronics, and laminate sheets, are plasma treated to promote adhesion. These are then all sandwiched together inside a heated mold that is tilted or vibrated just before a two-part polyurethane is injected. Each of the two polyurethane parts is temperature adjusted to match viscosities and thus improve mixing. The liquid polyurethane is injected through a nozzle and manifold to fill all the voids between the laminate sheets, and air escapes or is vacuumed out the top edge of the mold. The polyurethane sets quickly and sheets of sixteen or more payment cards can then be de-molded and singulated.

4 Claims, 10 Drawing Sheets

U.S. PATENT DOCUMENTS

| | | | |
|---|---|---|---|
| 7,237,724 B2 * | 7/2007 | Singleton | 235/492 |
| 7,503,503 B2 * | 3/2009 | Riedl et al. | 235/488 |
| 2003/0141373 A1 * | 7/2003 | Lasch et al. | 235/487 |
| 2004/0026518 A1 * | 2/2004 | Kudo et al. | 235/492 |
| 2006/0226240 A1 * | 10/2006 | Singleton | 235/492 |

* cited by examiner

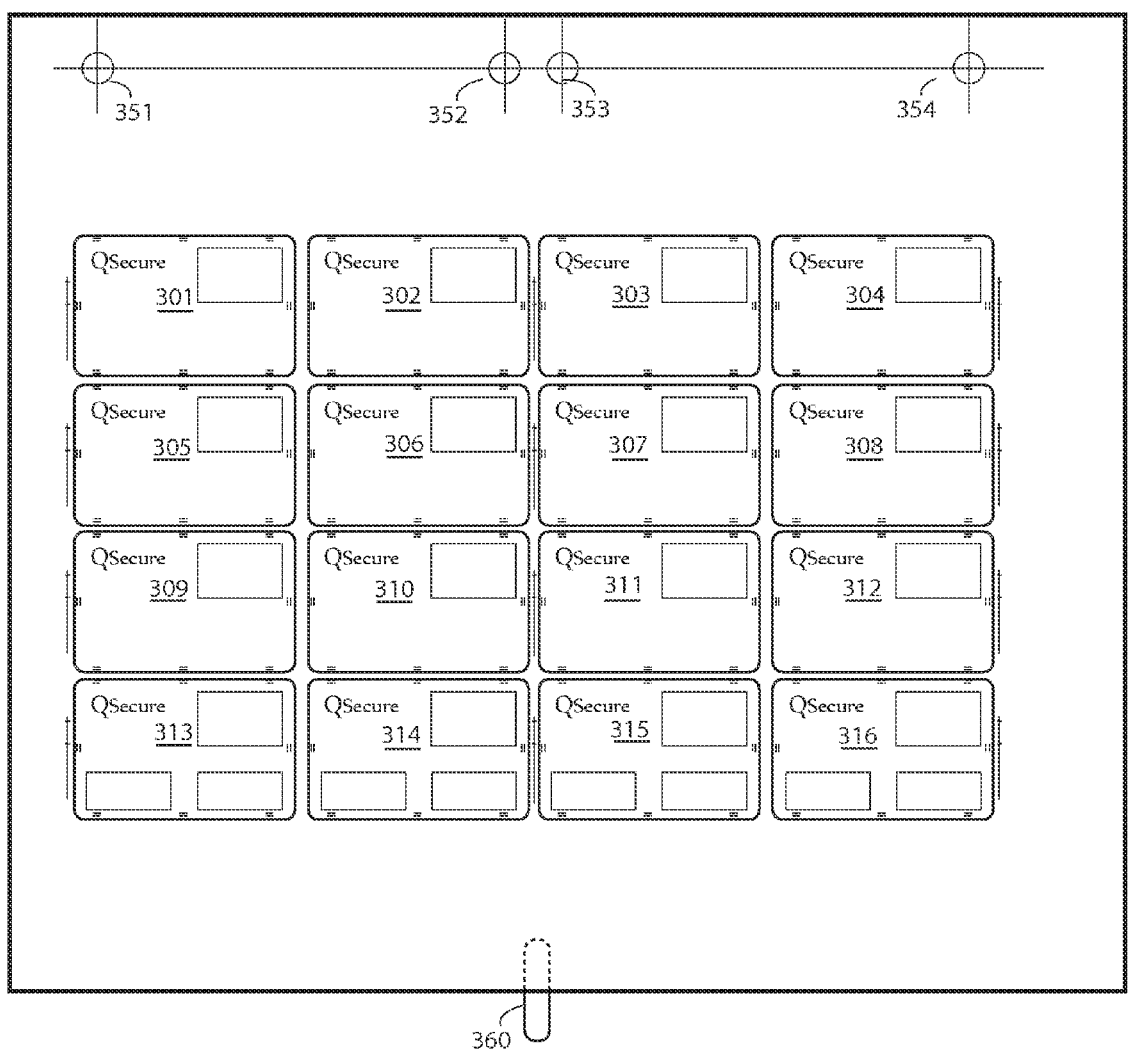

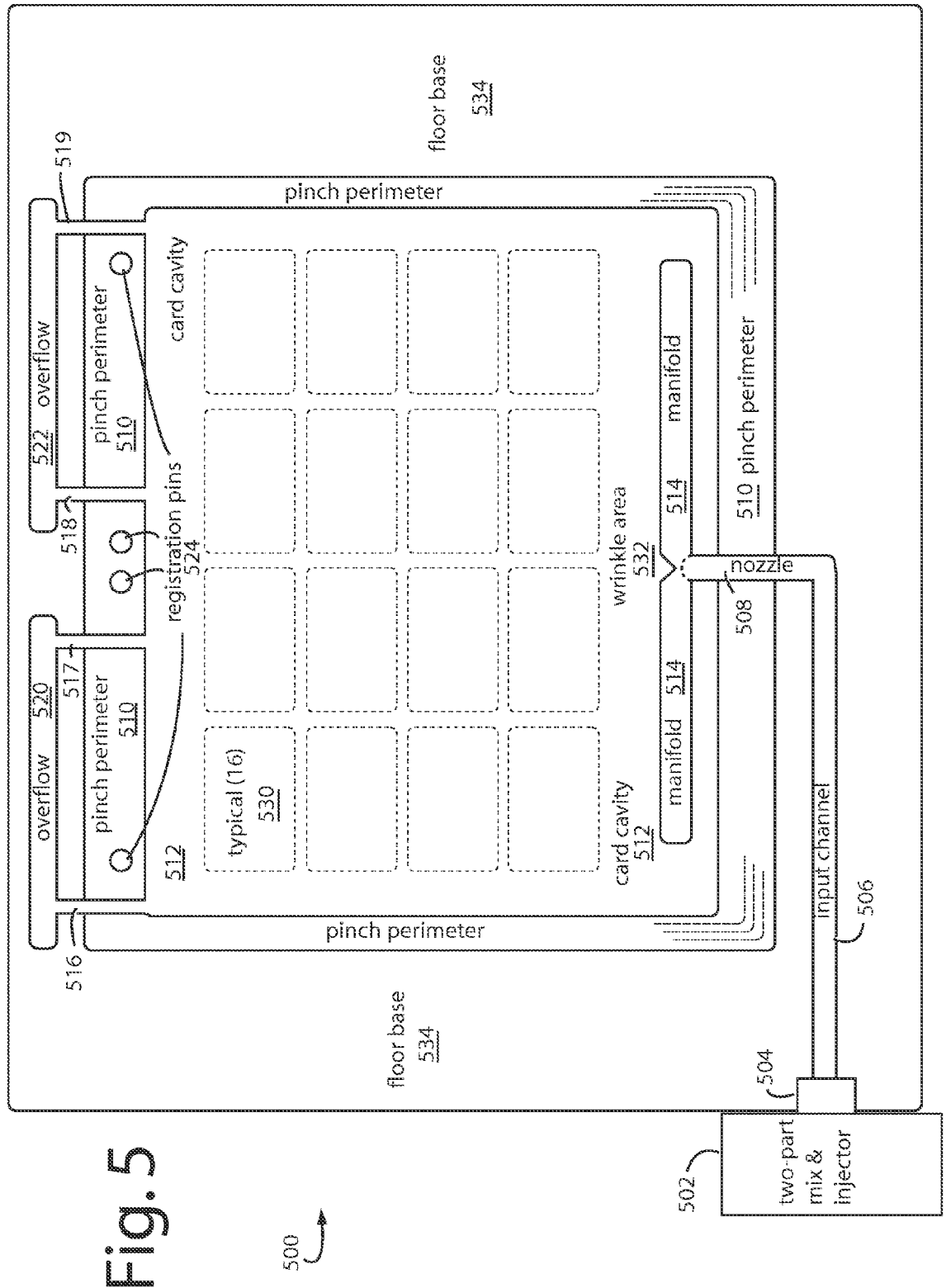

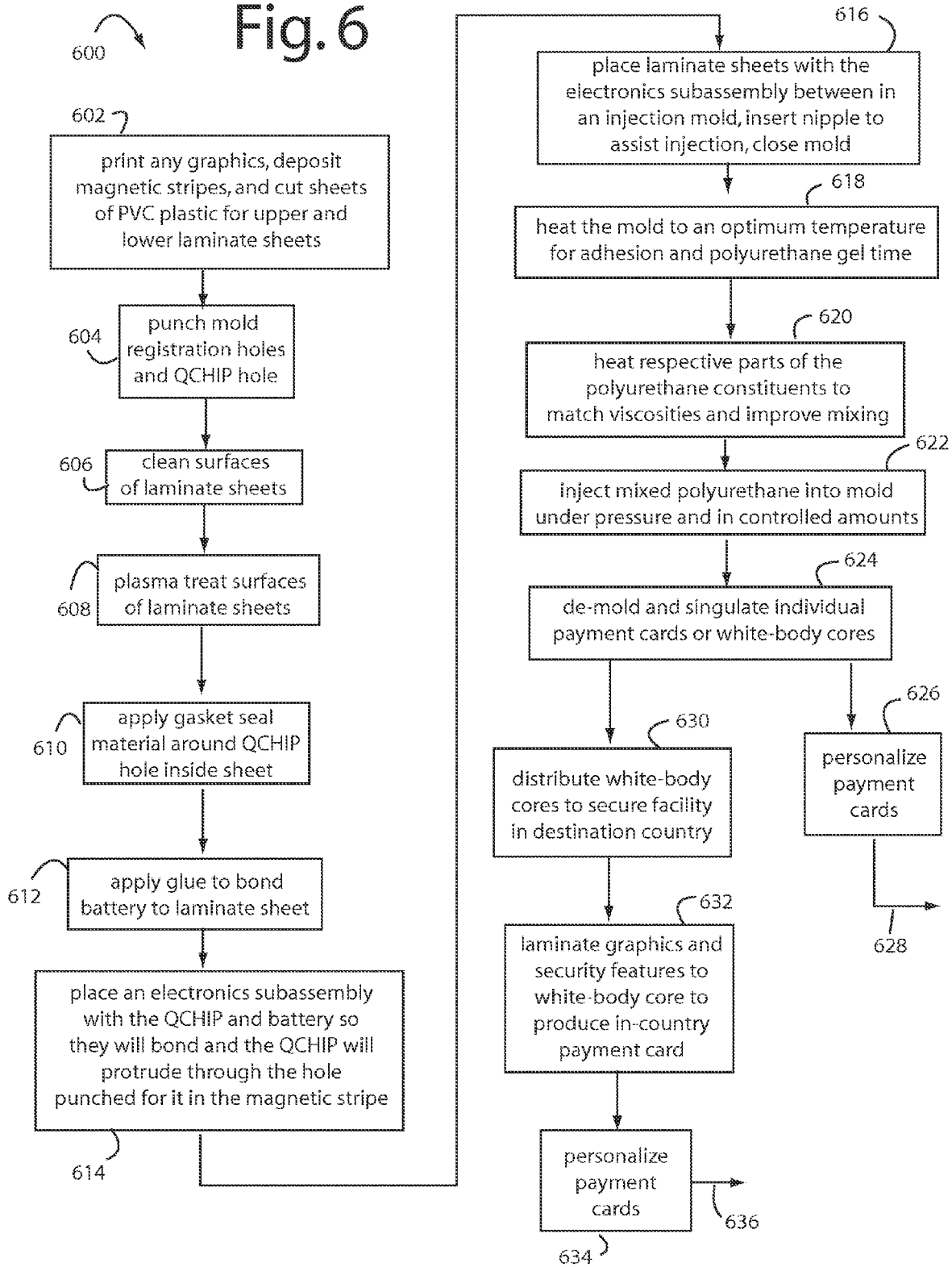

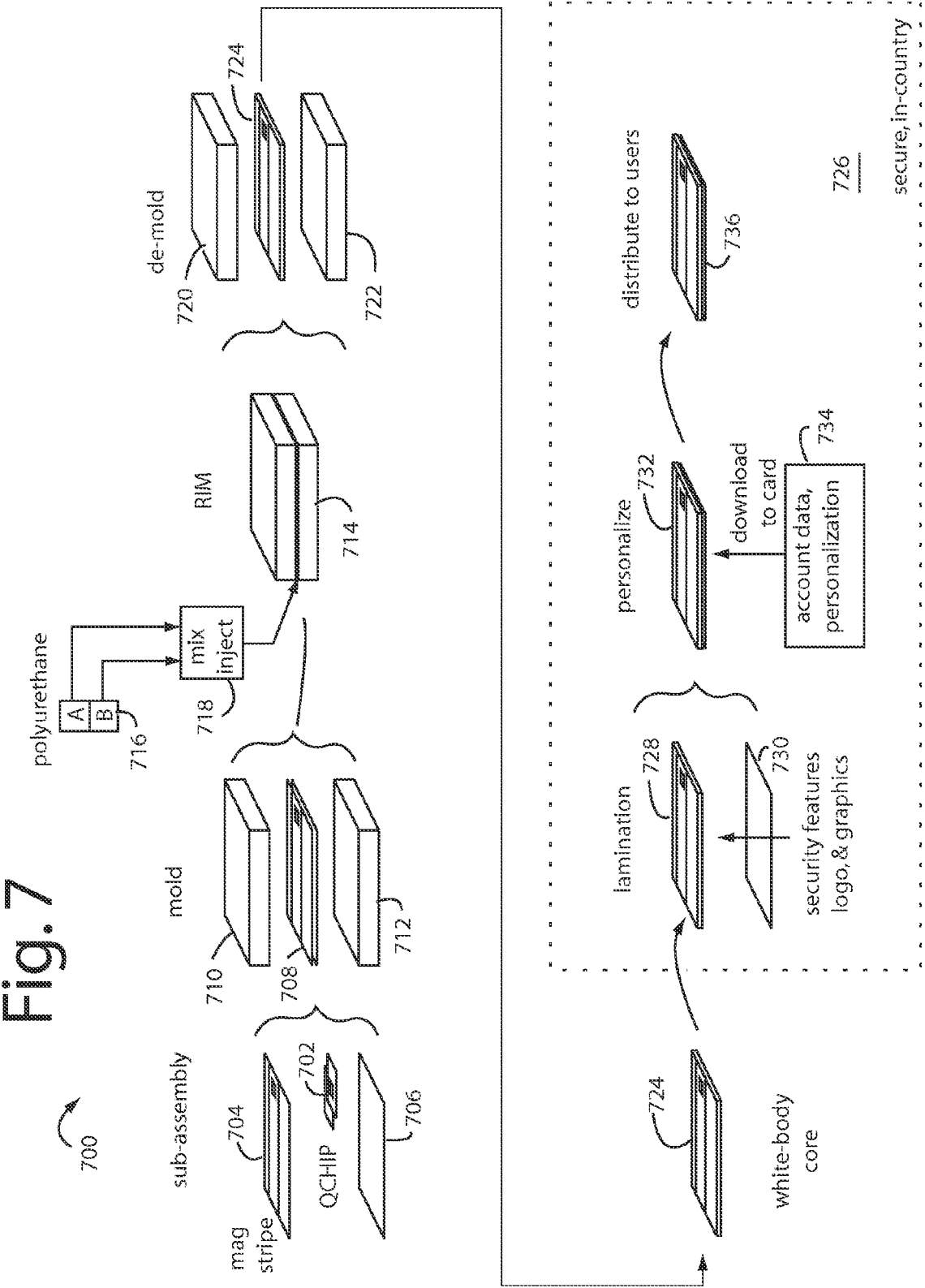

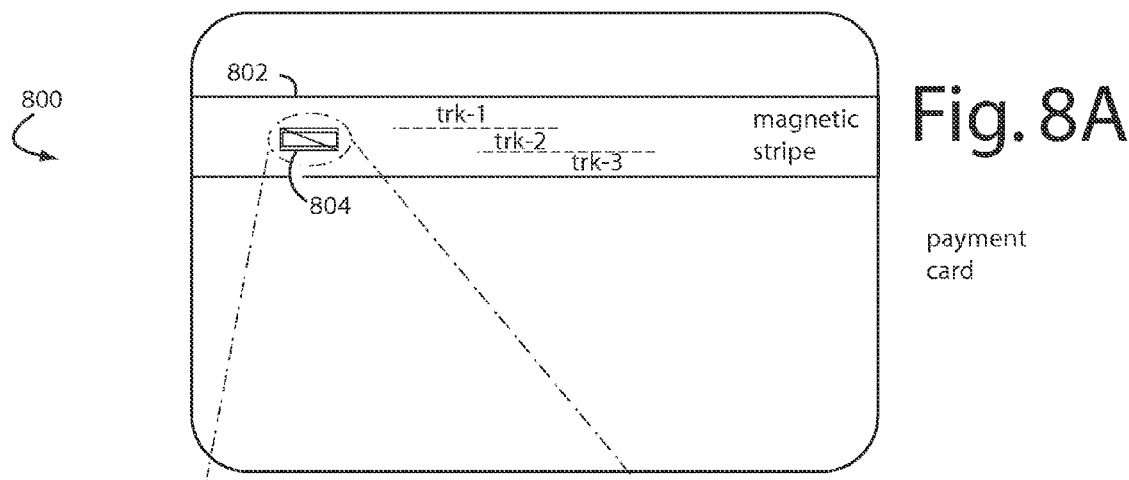
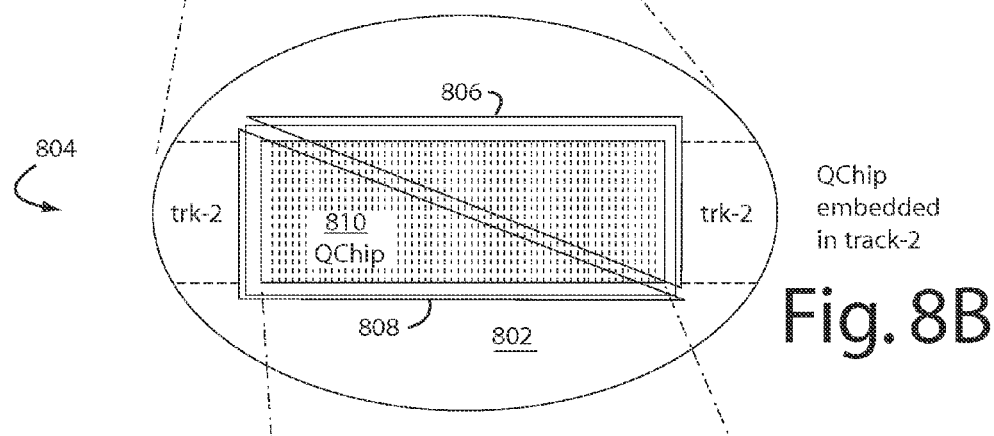
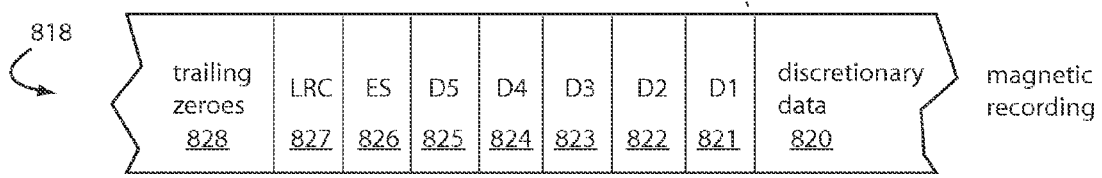

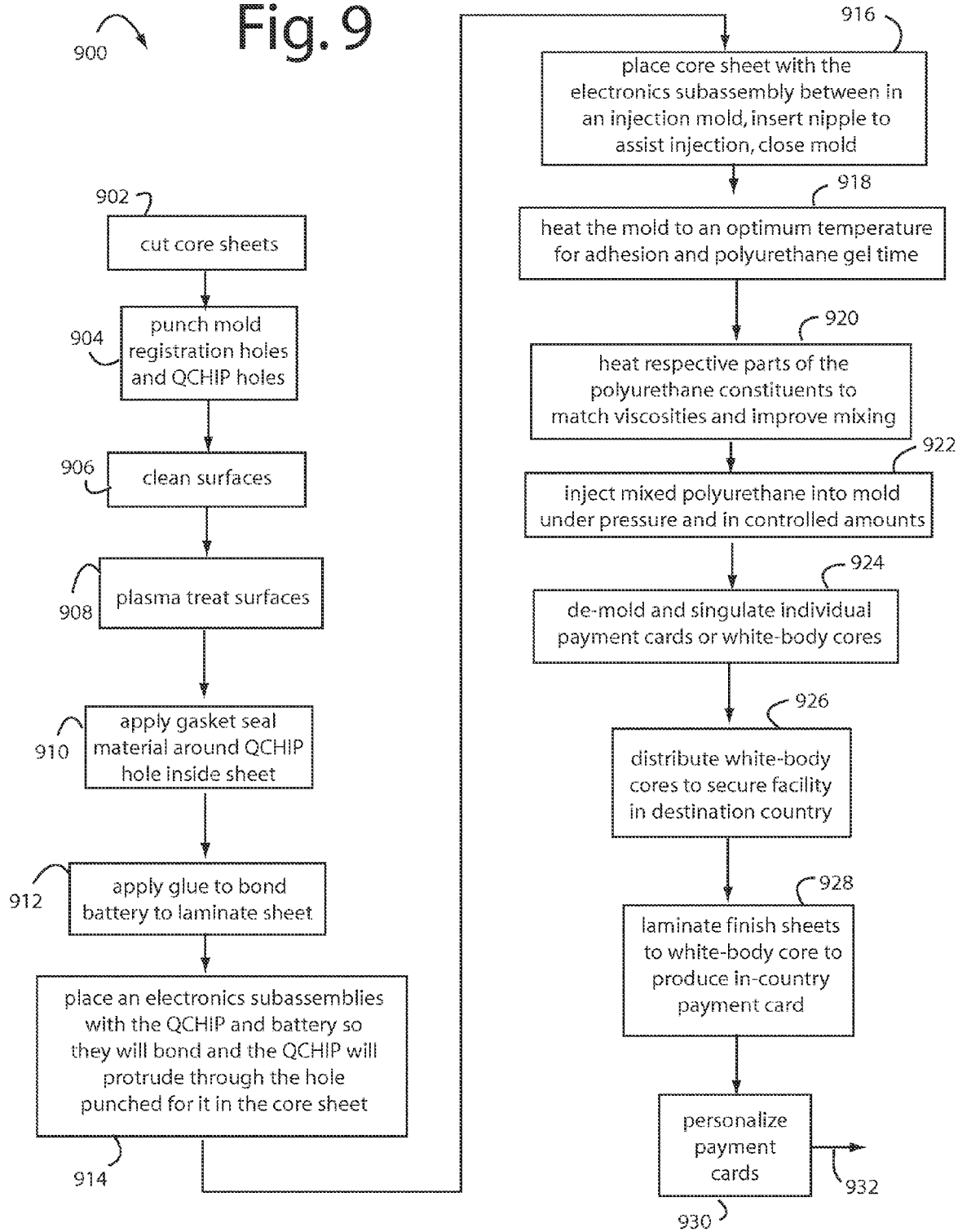

PAYMENT CARD MANUFACTURING TECHNOLOGY

RELATED APPLICATIONS

This Application is a continuation-in-part of U.S. patent application Ser. No. 11/676,285, filed Feb. 17, 2007 now abandoned, and titled PIN-SECURED DYNAMIC MAGNETIC STRIPE PAYMENT CARD. Such and the applications it, in turn, continues from are all incorporated herein by reference.

BACKGROUND OF THE INVENTION

1. Field of the Invention

The present invention relates to the manufacturing of payment cards, and in particular how to manufacture payment cards with electronic devices embedded in their magnetic stripes that allow at least a portion of the recorded magnetic account data to be autonomously reprogrammable.

2. Description of Related Art

At one time, credit cards were simple slabs of plastic with user account numbers embossed into them. Merchant embossing machines printed these numbers with carbon paper onto a sales slip that the customer would then sign. Company logos and other color printing were usually included on the outside surfaces. Such cards were relatively easy to manufacture, and unfortunately very easy to counterfeit.

Since then, various security measures have been addition to credit cards and other payment cards to control fraudulent use. These all have added to the difficulty in making a payment card that still is thin, flexible, and fits the original dimensions. Each issued card must have a useful service life that extends into years.

Including batteries and electronics into payment cards is especially challenging. The physical and environmental constraints generally result in a thin electronics package being sandwiched between two plastic sheets and/or embedded in injected plastic. The temperatures and pressures that the electronics are subjected to during manufacturing must be limited to prevent damaging the sensitive components. This generally means that high pressure, high temperature injection molding and lamination methods cannot be used.

The components and intermediates of payment cards are such that very effective plant and physical security measures must be employed to protect them from theft. Only a few locations around the world have the necessary assets to meet the requirements of issuing banks and governments. The intermediate assemblies become especially critical and valuable when they have received the company logos, special security measures, account numbers, and personalization data.

What is needed is a manufacturing method for producing payment cards with dynamic magnetic stripe devices that can be brought to a highly finished state in less than maximally secure production facilities.

SUMMARY OF THE INVENTION

Briefly, a payment card manufacturing embodiment of the present invention glues a thin battery and an autonomously reprogrammable magnetic device to the inside surface of one of two outer front and rear laminate sheets. The magnetic device is pressed through a precisely cut rectangular hole provided for it in the rear laminate sheet, and is sealed with a gasket bead. Such magnetic device is critically placed flush in a magnetic stripe area, and the end gaps are such that they will minimize adverse magnetic transitions seen by a reader between the magnetic stripe field and the autonomously reprogrammable magnetic device. The surfaces of the battery, electronics, and laminate sheets, are plasma treated to promote adhesion. These are then all sandwiched together inside a heated mold that is tilted or vibrated just before a two-part polyurethane is injected. Each of the two polyurethane parts is temperature adjusted to match viscosities and thus improve mixing. The liquid polyurethane is injected through a nozzle and manifold to fill all the voids between the laminate sheets, and air escapes or is vacuumed out the top edge of the mold. The polyurethane sets quickly and sheets of sixteen or more payment cards can then be de-molded and singulated.

An advantage of the present invention is the singulated intermediates after de-molding can be produced and stored in less than maximally secure facilities.

Another advantage of the present invention is the singulated intermediates after de-molding can be transferred to maximally secure facilities later for finishing with company logos, account data, and personalization.

A further advantage of the present invention is a payment card is provided that can help protect the user, the merchant and the issuing bank from fraud.

A still further advantage of the present invention is that a payment card is provided that does not require hardware or software changes to merchant point-of-sale terminals or automatic teller machines.

Another advantage of the present invention is that a card is provided that can express the personalities of several different kinds of payment cards issued by independent payment processors.

Another advantage of the present invention is a payment card is provided that can generate a dynamic account number upon each usage, and by doing so, authenticate itself to the transaction infrastructure, whether online or offline.

Another advantage of the present invention is that a system is provided that can identify when and where a transaction takes place. For example, if a card is skimmed by a waiter in a restaurant, the issuing bank will have sufficient data to determine when and where the fraud occurred based on the transaction date and the merchant ID of the transaction.

A further advantage of the present invention is that a payment card is provided that is not as easy to duplicate and use. Re-encoding of the magstripe with a stolen number by a fraudster will not work anymore as such did before, since the magnetic stripe information changes with each transaction.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 3 is a plan view of a typical obverse side laminate sheet used in a prototype of an embodiment of the present invention with 16-cards per sheet, and is often referred to FIGS. 4A and 4B are a plan view of the QCHIP, battery, and flex-circuit components of an electronics subassembly, and a cross sectional view of such electronics subassembly embedded in a finished payment card;

FIG. 5 is a plan view of the inside of a lower mold embodiment of the present invention and shows the relative placement of the cavities and channels milled in an otherwise flat surface for accommodating an reaction injection molding the components illustrated in FIGS. 2, 3, 4A, and 4B;

FIG. 6 represents the steps used in a method embodiment of the present invention to make white-body cores and payment cards that can be sent as intermediates for finalization in the respective destination countries and secure facilities;

FIG. 7 is an exploded assembly view of a process for making white-body cores and payment cards that can be sent as intermediates for finalization in the respective destination countries and secure facilities;

FIGS. 8A-8C are a plan view of the reverse side of a payment card embodiment of the present invention, a detail showing the QCHIP in position within track-2 of the magnetic stripe, and a representation showing how dynamic data bits provided by the QCHIP will merge into the statically recorded data in the surrounding track-2 area of the magnetic stripe;

FIG. 9 represents the steps used in a method embodiment of the present invention to make white-body cores and payment cards that can be sent as intermediates for finalization in the respective destination countries and secure facilities;

DETAILED DESCRIPTION OF THE INVENTION

Embodiments of the present invention produce payment cards with dynamic magnetic stripes.

Figure 1:
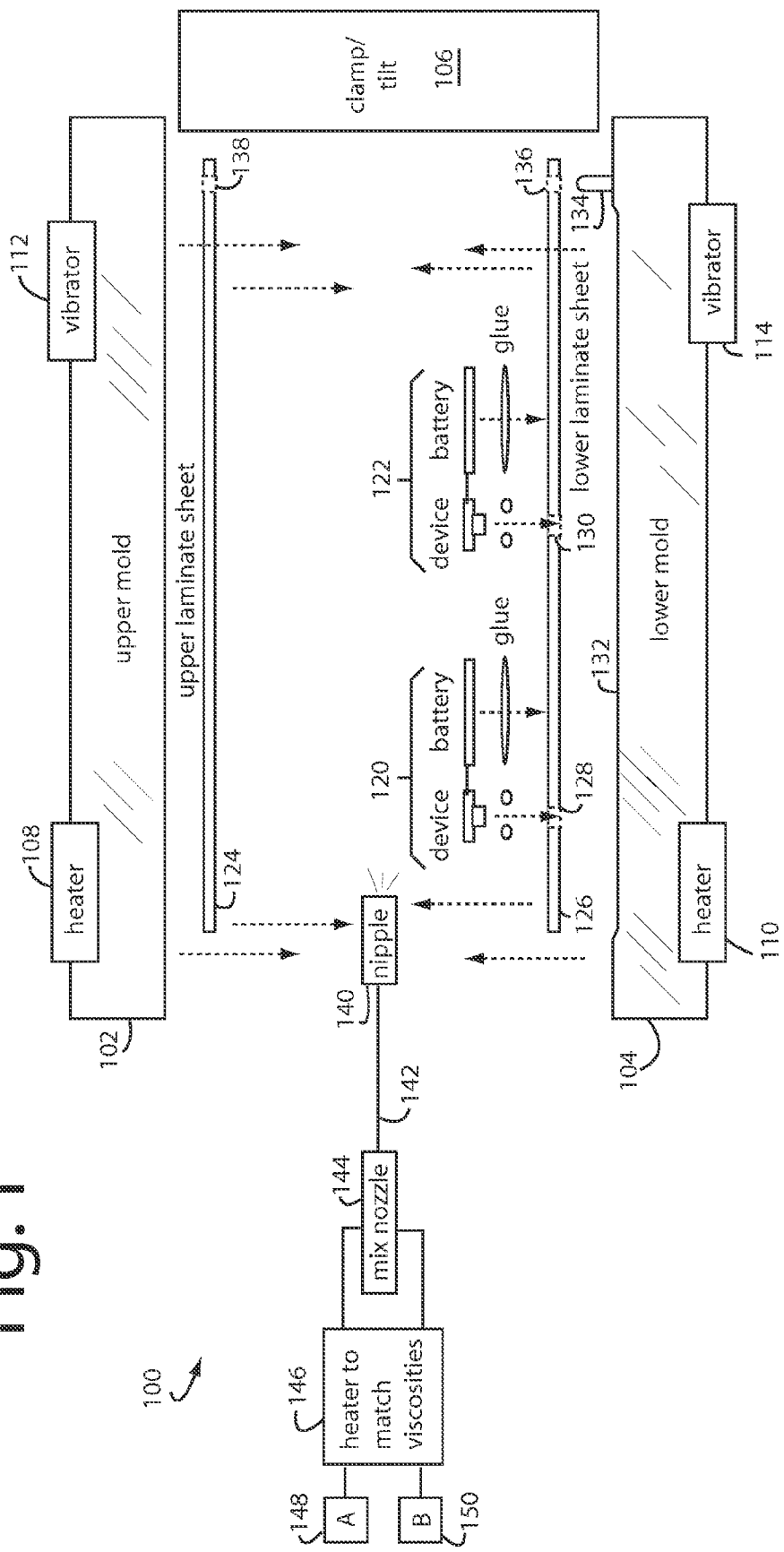
FIG. 1 is a schematic block diagram and cross-sectional view of a system embodiment of the present invention for manufacturing payment cards.

FIG. 1 illustrates a system embodiment of the present invention for manufacturing payment cards, and is referred to herein by the general reference numeral 100. Such system 100 employs an upper mold 102 that can be opened and hydraulically pressed together with a lower mold 104. Such molds are typically milled from billet aluminum. A mechanism 106 presses the two molds tightly together during plastic injection and can tilt the whole to help evacuate air in the voids displaced by the injected plastic. A pair of heaters 108 and 110 are used to pre-heat the molds so the injected plastic will flow and adhere better. Alternatively, a system of vibrators 112 and 114 can be used during plastic injection to eliminate bubbles.

In FIG. 1, two subassemblies 120 and 122, for two respective individual payment cards, are shown being sandwiched between an upper laminate sheet 124 and a lower laminate sheet 126. Such subassemblies typically comprise a dynamic memory device (QCHIP) attached to a circuit substrate (flex-circuit) and battery.

In prototypes that were constructed and tested, sixteen such individual payment cards were fabricated four-by-four in 18" wide by 16" long laminate sheets. The interior surfaces of the laminate sheets 124 and 126, and the two subassemblies 120 and 122 were cleaned and plasma etched before assembly to promote adhesion during plastic injection.

Embodiments of the present invention use forced air plasma surface treatments to modify the plastic surfaces before bonding with adhesives. Lectro Engineering, Company (St. Louis, Mo.), markets a suitable piece of equipment as the Lectro-Treat III (LT-III). See, U.S. Pat. No. 5,215,637, issued Jun. 1, 1993 to R. Lee Williams and assigned to Lectro Engineering Co. The LT-III uses a special discharge head to blow a low temperature plasma across plastic surfaces. The surface energy and wettability of plastics are improved for better adhesion. See, U.S. Pat. No. 5,798,146, titled SURFACE CHARGING TO IMPROVE WETTABILITY, issued Aug. 25, 1998 to Igor Murokh, et al., and assigned to Tri-Star Technologies (El Segundo, Calif.).

On a molecular level, the plasma process produces fine pits and cracks in the treated surfaces. These pits and cracks allow the adhesives to get a better grip with the increased surface area for a tighter bond. The LT-III process also oxidizes and cross-links the polymers in the plastic surfaces to help with chemical bonding and strength. Copper and/or acrylic coated aluminum batteries will adhere better too if their surfaces are plasma treated this way before bonding.

Other kinds of metal surface treatments are costly and/or not clean enough, e.g., bead/sand blasting, wet chemical etching, etc. The plasma surface treatments are used in the production line during the card lamination manufacturing process.

Accelerated temperature and humidity tests have shown that battery life and the service life of other components were not adversely affected by the plasma treatments. Such appears safe for all the electronic components used in card 300. The peel strengths of plasma treated aluminum, copper, and acrylic thin film batteries were greatly increased.

One important observation made during testing was the bonding of the pieces needed to be completed within eight hours of the surface plasma treatments. The adhesion and peel strength decays with time after the surface plasma treatment, probably due to oxidation and other aging affects.

Referring again to FIG. 1, precision-cut rectangular holes 128 and 130 are provided in lower laminate sheet 126 for a QCHIP magnetic memory device. The depth of a shallow well 132 milled in the lower mold 104 will control how thick the finished payment card will be. A pinch perimeter (see 510, FIG. 5) all around the edges of well 132 seals in the injected plastic during plastic injection. A set of registration pins 134 provide for precise alignment of the upper and lower laminate sheets 124 and 126 between upper and lower molds 102 and 104. These engage corresponding registration holes 136 and 138. A disposable plastic nipple 140 is placed between the upper and lower laminate sheets 124 and 126 before closing the upper and lower molds 102 and 104 together. A channel 142 cut into the lower mold surfaces conduits injected liquid plastic into the nipple 140 from a mixer nozzle 144. A heater 146 adjusts the respective temperatures of the two-part polyurethane (A and B) so their viscosities are about the same. Such promotes better mixing and more consistent results. A part-A pump 148 and a part-B pump 150 provide the respective two parts of the polyurethane under pressure. The total injected volume is metered and experience will dictate the correct volumes to be injected. Gel times of the polyurethane can be under a minute from the time the two parts are mixed together in mixer nozzle 144 and forced in between the upper and lower laminate sheets 124 and 126. The mold temperatures can be varied to adjust the gel times for optimum results.

Figure 2:
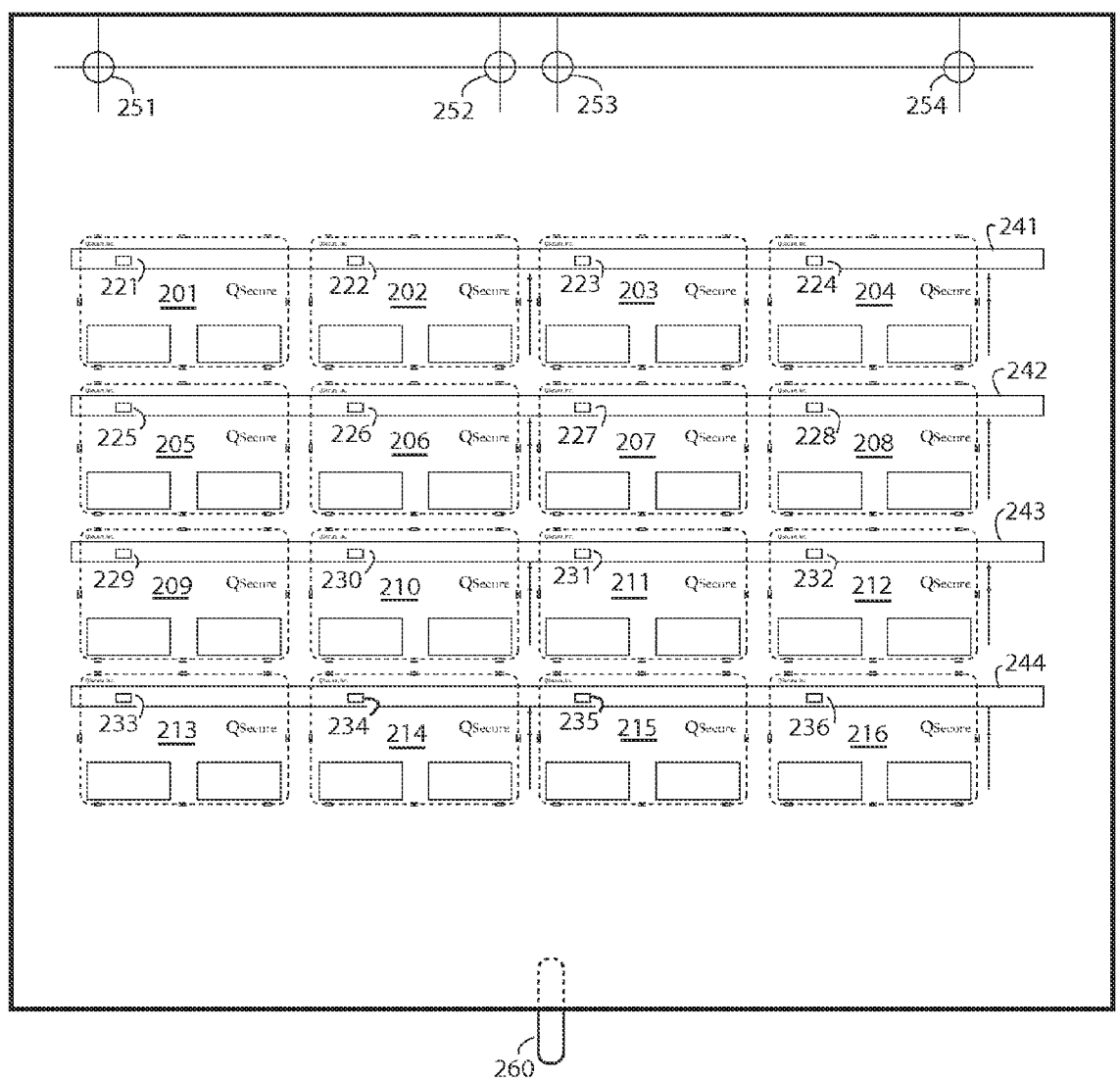
FIG. 2 is a plan view of a typical reverse side laminate sheet used in a prototype of an embodiment of the present invention with 16-cards per sheet, and is often referred to herein as the "lower" laminate sheet with the magnetic stripes and access holes for the QCHIP's. It is this reverse side that would usually have the users' signature panel and CVV values.

FIG. 2 shows a typical lower laminate sheet 200 that was used in prototyping. Sixteen card outlines 201-216 are shown, and each has a QCHIP cutout 221-236 in each of four deposited magnetic stripes 241-244. After de-molding, the sixteen cards are singulated in a punch along outlines 201-216. Optical targets 251-254 are used to punch registration holes before molding. A RIM injection nipple 260 is shown for its typical placement relative to the sixteen card outlines 201-216.

FIG. 3 shows a typical upper laminate sheet 300 that was used in prototyping. Sixteen card color panels 301-316 are shown. Optical targets 351-354 are used to punch registration holes. A RIM injection nipple 360 is shown for its typical placement relative to the sixteen card panels 301-216.

Figure 4A:
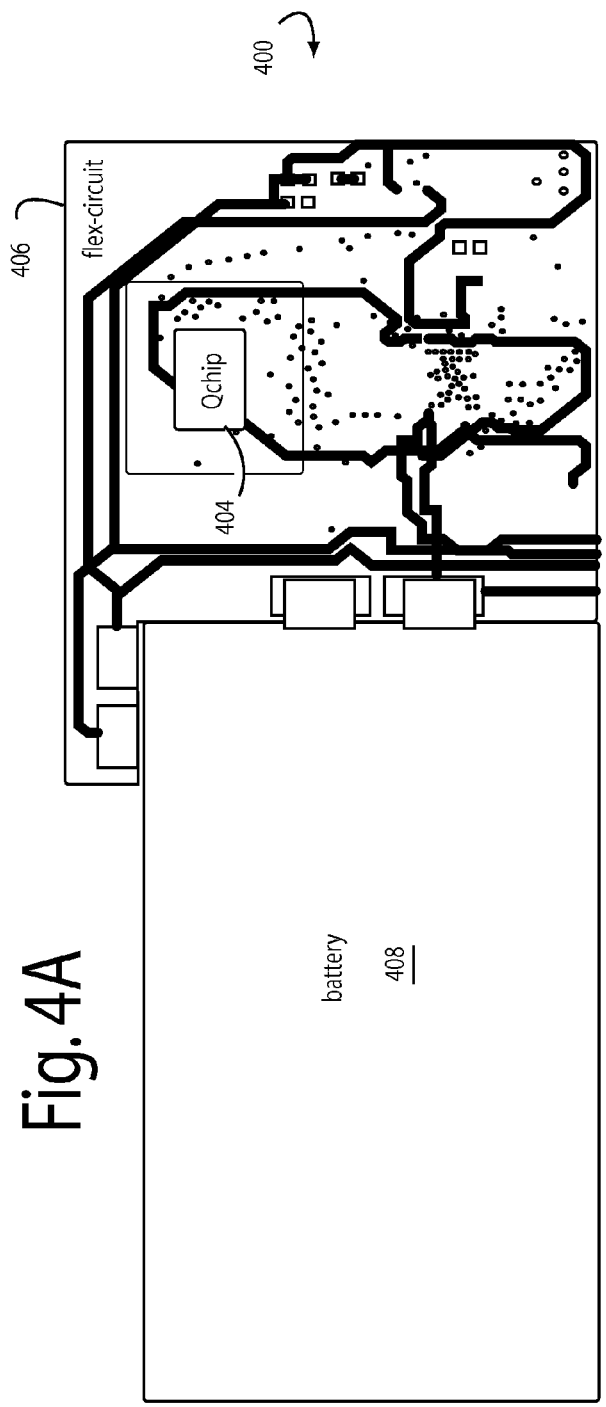
Figure 4B:
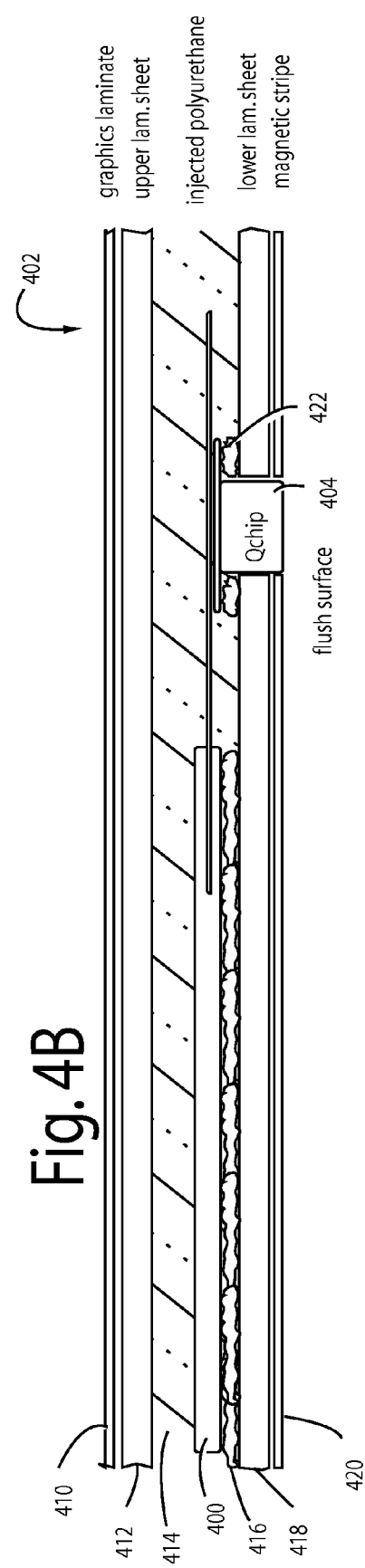

FIGS. 4A and 4B shown an electronics subassembly 400 (in plan view) that is ultimately molded inside a payment card 402 (in cross section). A QCHIP 404 is mounted on a flex-circuit 406 and powered by a battery 408. Such electronics subassembly is alive and functional during its embedding in polyurethane within payment card 402 by the RIM process. A final laminate 410 has security features and company logos that are applied in secure facilities. If final laminate 410 is to be applied later when transferred to a secure manufacturing facility in-country, then the rest constitutes what is called herein a "white-body" or card core. Such can be any color, the term came from the white injected polyurethane that was used in early prototypes.

An upper laminate sheet 412 is bonded to a polyurethane fill 414 that was injected during molding an RIM operations. The tops of electronic subassembly 400 are fully contacted by the polyurethane fill 414, but the bottom of the battery 408 is glued with cyanoacrylate 416 to a lower laminate sheet 418 to exclude the polyurethane fill 414. A magnetic stripe 420 is deposited beforehand on the lower laminate sheet 418, and punched to accept QCHIP 404 with a flush surface. A gasket 422 seals the perimeter of QCHIP 404.

A mold embodiment of the present invention for making the payment cards and white-body cores described herein is shown in FIG. 5, and is referred to by the general reference numeral 500. FIG. 5 is a plan view of the inside of the lower mold which has a number of precision milled cavities and channels. A matching top mold has a simple flat surface and therefore does not need to be diagramed here. Both molds, top and bottom, can be milled from billet aluminum blocks. Both have heaters that can maintain a temperature during operation of 105 F to 115 F. The exact temperature to use will depend on what produces the best balance of plastic adhesion and gel times.

Mold 500 has a two-part polyurethane mixer and injector 502 with an injection valve 504. When the upper and lower molds are closed together in a 20-ton press, a polyurethane liquid mixture is pressurized to flow down a channel 506 into a nozzle area 508. Such accommodates a small plastic nipple that placed between the upper and lower laminate sheets just before closing the molds. A pinch perimeter 510 is less than six mils deep, and is intended to pinch the upper and lower laminate sheets together so that injected liquid polyurethane cannot escape. A deeper card cavity area 512 sets the finished thickness of the completed payment card or white-body core, and accommodates the constituent thicknesses built up by the upper and lower laminate sheets, the batteries, electronics subassembly, and QCHIP. A manifold channel 514 is cut deeper still.

Injected liquid polyurethane enters left and right manifold areas 514 between the upper and lower laminate sheets and does not contact the mold itself. So mold release above and below on the molds is required only in the input channel 506 and nozzle 508 areas. The particular reliefs milled in mold 500 for the manifold areas 514 allow the lower laminate sheets to swell a bit during injection to accommodate a better flow and distribution around and up through card cavity area 512. Gases that existed between the upper and lower laminate sheets before injection, and any excess injected material will pass out through the channel reliefs provided by exhaust channels 516-519 into overflow cavities 520 and 522. Sighting the overflow material here can be used to ascertain if the amount of polyurethane being injected in each cycle is optimum.

Before the molds are closed together in each cycle, registration pins 524 are used together with matching registration holes in the upper and lower lamination sheets to set the proper alignment. The pinch perimeter 510 will thereafter keep the two aligned during injection.

A singulated payment card or white-body core, typical of sixteen on a sheet, is represented in FIG. 5 by outline 530. The four-by-four matrix is separated from manifold areas 514 by a wrinkle area 532. The pressures and heat generated by injecting liquid polyurethane from the nozzle 508 into the manifold areas 514 typically causes wrinkling within the upper and lower laminate sheets in the confined area of the junction. The separation distance provided by wrinkle area 532 allows all sixteen payment cards or white-body cores to be free of wrinkles and imperfections after singulation. Otherwise, a nozzle 508 with a duck-bill type of spread would be needed to control such wrinkling.

A surrounding floor base 534 has the highest elevation, and makes a perfect flat contact with the flat upper mold when the two are closed together. A 20-ton hydraulic press produced good results.

FIG. 6 represents a method embodiment of the present invention for manufacturing white-body cores and completed payment cards, and is referred to herein by the general reference numeral 600. Method 600 begins with a step 602 in which PVC sheets are printed and cut, and made ready for molding an electronics subassembly and QCHIP inside. A step 604 punches registration holes and the rectangular holes needed in the magnetic stripes for the QCHIP's. The surfaces of the PVC sheets are cleaned of lint, particles, oils, and other contamination, in a step 606. The surfaces are then plasma treated in a step 608 to improve bonding with the injected polyurethane. A gasket seal is applied in a step 610 around the edges of the QCHIP openings to fix the QCHIP finished surface heights and to prevent injected polyurethane from lifting the QCHIP or leaking out past it. A step 612 applies glue, such as cyanoacrylate, to the whole surface of the battery and thus keep injected polyurethane from getting between the battery and its adjacent laminate sheet. A step 614 uses a pick and place machine, for example, to precisely place the electronics subassembly and QCHIP in the hole punched for the QCHIP. Longitudinal gaps between the QCHIP and the surrounding magnetic stripe in the finished payment cards must be kept to an absolute minimum, e.g., less than one mil.

Molding begins with a step 616 in which the laminate sheets, with their electronics assemblies already mounted, are registered on the pins provided in an injection mold. The mold is closed and heated in a step 618 such that when the polyurethane is injected its adhesive and encapsulating performance will be optimized. The two precursor parts for the polyurethane are differentially heated in a step 620 to improve their ability to mix and react with one another. The mixture is injected while it is reacting in a step 622, and will fill all the voids between the upper and lower laminate sheets. Within seconds, the reaction will complete, or gel, and solidify. De-molding is done in a step 624 and the white-body cores or payment cards are singulated or diced with a punch.

If all the graphics and security features have already been applied to prepare a complete payment card, then a step 626 personalizes a payment card 628 with user account information.

Otherwise, if the graphics and security features are to be applied in a destination country in a secure manufacturing facility, then a step 630 distributes the white-body cores to those destination countries. Before that happens, such may be stockpiled in anticipation of need. However, since the white-body core is already functional and the battery has begun its service life, the time spent on the shelf waiting for shipment to final assembly should be kept short. Once at a secure facility in a destination country, a step 632 is used to complete the white-body core by adding security features and graphics. Then a step 634 personalizes a payment card 636 with user account information.

FIG. 7 represents the pieces and machines used in a manufacturing system embodiment of the present invention for manufacturing white-body cores and completed payment cards, and is referred to herein by the general reference numeral 700. System 700 comprises a QCHIP electronics subassembly 702 that is pre-attached to a first laminate sheet 704 before molding with a second laminate sheet 706. A stack 708 is closed between top and bottom molds 710 and 712. A RIM process 714 includes injecting two-part polyurethane 716 through a mixer and injector 718 into the closed mold. De-molding separates top and bottom molds 720 and 722 from a sheet of white-body cores 724. Singulation can occur at this point or later. Once in its destination country and at a secure facility 726, a white-body core 728 has its security features, graphics, and logo applied with a laminate 730. A payment card 732 is then ready to receive a download of account and personalization data 734. Finished, ready-to-use cards 736 are then available to distribute to users within the destination country.

In general, each payment card embodiment of the present invention includes a dynamic magnetic stripe to provide a one-time-use personal account number (PAN), and may include a visual display for a one-time-use dynamic personal identification number (PIN). The PAN and PIN numbers that are output will independently sequence through precomputed values loaded into Crypto tables embedded in each card. Alternatively, a crypto-processor can be embedded within each card that computes such PAN and PIN values from a secret seed value and algorithm.

Any visual displays included in payment cards must provide years of service in a credit card type of use and environment, and must be flexible, easily readable, and allow for adequate battery life. A suitable electronic-paper, electrophoretic display is marketed by SiPix Imaging, Inc. (Fremont, Calif.) as their ePaper Display.

In a card-present transaction, a POS merchant location machine-reads a dynamic magnetic swipe data and keys in a dynamic PIN into a legacy card reader. The PAN and PIN readings are attached to a transaction value and merchant identification, and all these data items are electronically forwarded in a message to a merchant acquirer.

For card-not-present transactions, users read off a displayed version of the PAN and a dynamic PIN, and speak them into a phone, or key them in, e.g., while logged onto an Internet sales merchant. Such data are forwarded in an electronic message that typically also includes the transaction value and merchant identification.

Crypto tables can be generated either by a bank or by a personalization company, and then programmed into the cards during a personalization step. The bank can control the entire cryptogram generation process and does not have to share table generation keys or algorithm details. Each card can in fact use entirely different cryptographic schemes.

The overall system is secured end-to-end by providing the technology that goes into the card the member uses and a hardware security module (HSM), Authenticator. In some cases, users are provided a reference design for Authenticator and will implement their own algorithms on their own boxes or on existing systems. A Q-box or other new tooling can be added to the personalization process since the programming of the QCHIP within the stripe needs to be done by a new piece of equipment and such can include technology licensed to end-users who will do their own implementations.

In order to manufacture a well bonded and void free electronic financial card capable of passing industry standard ruggedness and aesthetic testing, some internal component surface treatment must be done before bonding. The adhesion strength between the PVC, and other material, and the pre-lamination sheets to its electronic flexible circuit and thin film battery must be very strong. E.g., in order to pass the ISO mechanical tests, in particular the torsion, bending and peel tests. If the surface adhesion is poor, then voids, fissures, and fractures inside a finished card will develop and shorten its expected life.

Polyethylene, polypropylene, thermoplastic olefins, PVC, PET, and other sheet plastics are difficult to bond together with typical adhesives. Such plastics have low surface energies and low wetting tension, as measured in dynes/cm. Batteries with copper and acrylic coated aluminum thin film used in the electronic card industry are also difficult to bond together with the other plastic pieces in a laminated card.

Recent peel tests have shown that most pre-lamination sheets can be peeled off cleanly from electronic inlays and batteries if there have not been any surface treatment. Multiple layers of materials within the card is an expensive and time-consuming process with low yields. Pockets or voids can be provided for the components float, but any air trapped inside can inflate and deflate with temperature and lead to stress fractures and failures.

FIGS. 8A-8C show a payment card 800 that includes a magnetic stripe 802 with three recorded tracks, e.g., trk-1, trk-2, and trk-3. These tracks are recorded according to ISO industry standards for payment and credit cards. A dynamic portion 804 of magnetic stripe 802 is located in trk-2. In FIGS. 8A-4C, such dynamic portion 804 is at the end of a discretionary data field. Alternatively, the dynamic portion 804 may be placed inside the discretionary data field. Such dynamic portion 804 comprises a pair of swipe sensor contacts 806 and 808 which overlay a magnetic device (QCHIP) 810. The QCHIP 810 is inlaid flat into magnetic stripe 802 and trk-2 data is statically recorded in alignment with the QCHIP.

Swipe contacts 806 and 808 comprise a swipe sensor that is used to detect the change in conductivity that occurs as the card encounters the read-head and its usually metallic shroud. As the head passes over these contacts it creates a low-impedance electrical path between them, which underlying circuitry detects. They present no significant impediment to reading the magnetic data beneath them. The QCHIP 810 uses the swipe contact event information in a number of ways, e.g., to wake up and present its data, to update the data, to estimate battery life, to count transactions, etc. These pads may also be used to permanently disable the personalization circuit within the chip after the personalization operation has been completed, e.g., by blowing a fuse with an injected DC current.

In FIG. 8C, a discretionary data field 820 includes QCHIP 810 as its last few digits (D1-D5) 821-825, end-sentinel (ES) 826, and longitudinal redundancy check (LRC) 827. The seven characters provided by QCHIP 810 are dynamic magnetic data characters. A trailing zeroes field 828 is static and follows the LRC 827. The QCHIP 810 must compute the correct value of LRC 827 from what precedes it in characters (D1-D5) 821-825, ES 826, and in the discretionary data field 820. For illustration, such also includes here the PAN, start sentinel, and field delimiter.

In some applications it will be better to produce white-body cores without the rear outside lamination and magnetic stripe. Such is left to be applied in the secure facility where the core is laminated between two outside finish sheets that include all the graphics, security features, signature panels, and magnetic stripe. As a consequence, the mold used to inject the polyurethane on the side adjacent to the QCHIP must have reliefs that will allow the QCHIPS to protrude enough to finish flush with the magnetic stripe layer that will be applied later at the secure facility.

FIG. 9 represents a method embodiment of the present invention for manufacturing white-body cores and completed payment cards, and is referred to herein by the general reference numeral 900. In actual practice, the "white-body" cores can be any color, even transparent. Method 900 begins with a step 902 in which PET+PC-blend core sheets are cut and made ready for mounting an electronics subassembly and QCHIP on one side. A step 904 punches registration holes and the rectangular holes needed for the QCHIP's. The surfaces of the core sheets are cleaned of lint, particles, oils, and other contamination, in a step 906. The surfaces are then plasma treated in a step 908 to improve bonding with the injected polyurethane that will come later. A gasket seal is applied in a step 910 around the edges of the QCHIP openings to fix the QCHIP finished surface heights and to prevent injected polyurethane from lifting the QCHIP or leaking out past it. A step 912 applies glue, such as cyanoacrylate, to the whole surface of the battery and thus keep injected polyurethane from getting between the battery and its adjacent laminate sheet. A step 914 uses a pick and place machine, for example, to precisely place the electronics subassembly and QCHIP in the hole punched for the QCHIP. Longitudinal gaps between the QCHIP and the surrounding magnetic stripe in the finished payment cards must be kept to an absolute minimum, e.g., less than one mil.

Molding begins with a step 916 in which the core sheets, with their electronics assemblies already mounted, are registered on the pins provided in an injection mold. The QCHIP's are nestled into special reliefs in one of the molds that allows them to protrude in the finished core. The mold is closed and heated in a step 918 such that when the polyurethane is injected its adhesive and encapsulating performance will be optimized. The polyurethane is injected on only one side of the core sheet, the side to which the subassemblies are glued, and the injected polyurethane will contact the face of the mold on that side. So mold release is needed over the entire surface of that mold.

The two precursor parts for the polyurethane are differentially heated in a step 920 to improve their ability to mix and react with one another. The mixture is injected while it is reacting in a step 922, and will fill and encapsulate the subassemblies. Within seconds, the reaction will complete, or gel, and solidify. De-molding is done in a step 924 and the white-body cores are released. These can be singulated or kept in a 16-up sheet.

The graphics and security features can be applied in a destination country in a secure manufacturing facility, so a step 926 distributes the white-body cores to those destination countries. Before that happens, such may be stockpiled in anticipation of need. However, since the white-body core is already functional and the battery has begun its service life, the time spent on the shelf waiting for shipment to final assembly should be kept short. Once at a secure facility in a destination country, a step 928 is used to complete the white-body core by adding finish laminate sheets, security features and graphics. Then a step 930 personalizes a payment card 932 with user account information. Another way to look at the process is illustrated in FIG. 10.

Figure 10:
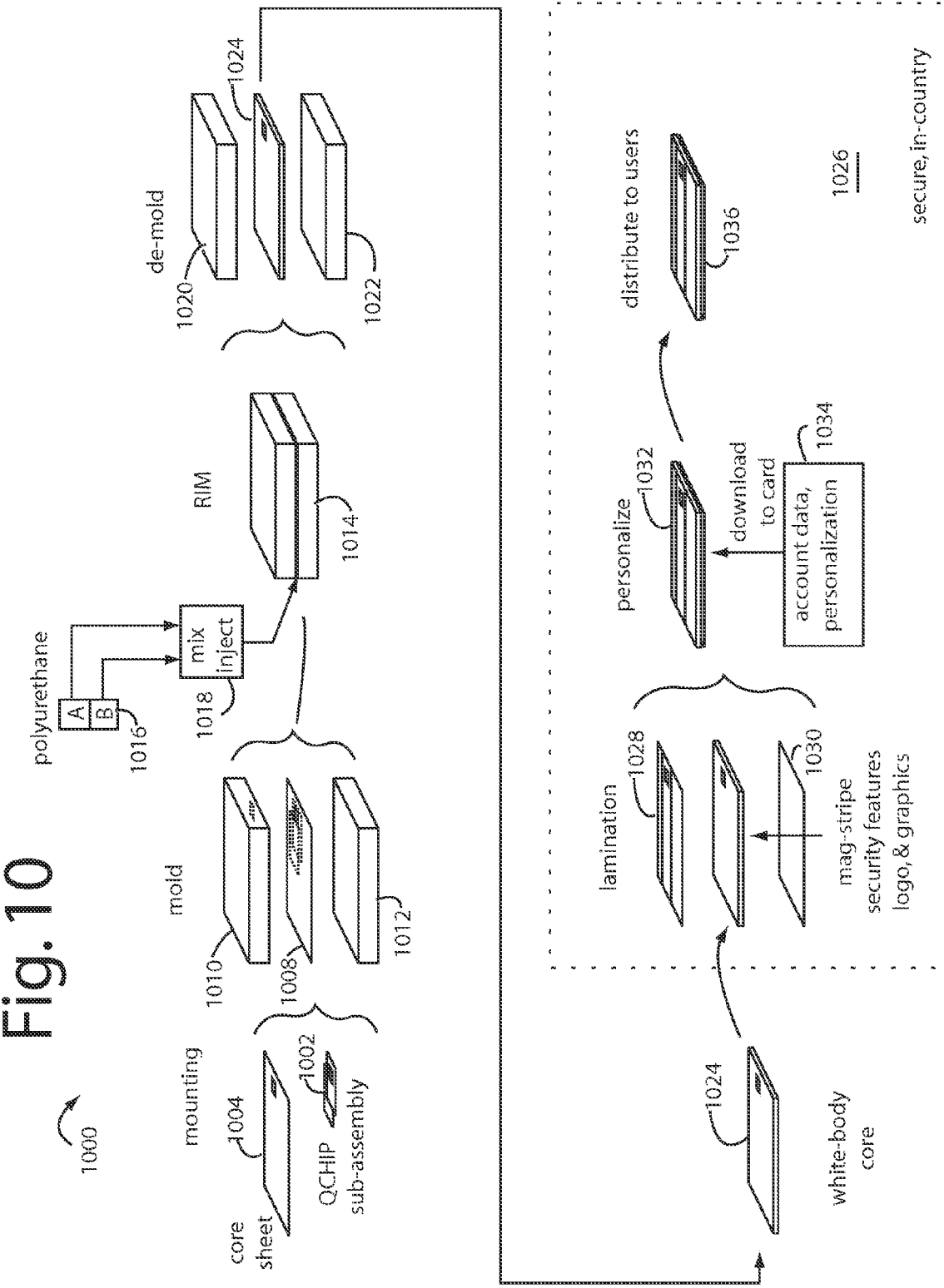
FIG. 10 is an exploded assembly view of a process for making white-body cores that can be sent as intermediates for finalization in the respective destination countries and secure facilities.

A core-based system 1000 represented in FIG. 10 is a little different than system 700 represented in FIG. 7. The system 1000 uses a single core sheet of a blend of polyethylene terephtalate (PET) and polycarbonate (PC), rather than two outer sheets of laminate with polyurethane injected in between. Such PET and PC provides impact, chemical, and heat resistant characteristics that are well suited to particular uses described here.

System 1000 comprises a QCHIP electronics subassembly 1002 that is pre-attached to a core sheet 1004 before molding. An assembly 1008 is closed between top and bottom molds 1010 and 1012. A RIM process 1014 injects a two-part polyurethane 1016 through a mixer and injector 1018 into mold after closing and heating. After the injected polyurethane has gelled, a de-molding separates top and bottom molds 1020 and 1022 from white-body cores 1024. The QCHIP's will protrude from the surface by an amount necessary to result in a flush surface after finishing with a magnetic stripe. Singulation can occur at this point or kept in a sheet. Once in its destination country, and at a secure facility 1026, the white-body core is finished with a magnetic stripe and reverse side laminate 1028 and a front side laminate 1030. These provide necessary security features, graphics, and system logos. A payment card 1032 is then ready to receive a download of account and personalization data 1034. Finished, ready-to-use cards 1036 are then available to distribute to users within the destination country.

Although particular embodiments of the present invention have been described and illustrated, such is not intended to limit the invention. Modifications and changes will no doubt become apparent to those skilled in the art, and such is intended that the invention only be limited by the scope of the appended claims.

The invention claimed is:

1. A manufacturing system for ultimately making a payment card, comprising:
   pre-assembling a dynamic memory device, circuit substrate, and a battery into an operational subassembly;
   attaching said subassembly with adhesives to a sheet prepared to define a plurality of holes that will allow at least a portion of the sub-assembly to protrude through the sheet and rest flush with the sheet's surface, and prevent plastic in a later step from getting under said battery or leaking out said holes past said dynamic memory device; and
   molding plastic to encapsulate said subassembly on one side of said sheet;
   wherein, a card core is readied that can be finished into a payment card by adding a magnetic stripe through which said dynamic memory device protrudes and finishes flush at the final surface.

2. The system of claim 1, wherein:
   the steps are such that a card core can be produced in a non-maximally secure facility able to do reaction injection molding.

3. The system of claim 1, further comprising:
   preparing the surfaces of said sheet and subassembly for better adhesion of plastic during the step of molding.

4. The system of claim 1, further comprising:
   laminating outer sheets to said card core that include payment card security features, a magnetic stripe, and graphics.

* * * * *